No. 622,832. Patented Apr. 11, 1899.
F. WESEL.
ROUTING MACHINE.
(Application filed Mar. 23, 1898.)
(No Model.) 8 Sheets—Sheet 1.

FIG. 1.

WITNESSES:
INVENTOR
Ferdinand Wesel
BY
ATTORNEYS.

No. 622,832.  
F. WESEL.  
ROUTING MACHINE.  
(Application filed Mar. 23, 1898.)  
(No Model.)

Patented Apr. 11, 1899.

WITNESSES:

INVENTOR  
Ferdinand Wesel  
BY  
ATTORNEYS.

No. 622,832. Patented Apr. 11, 1899.
F. WESEL.
ROUTING MACHINE.
(Application filed Mar. 23, 1898.)
(No Model.) 8 Sheets—Sheet 5.

WITNESSES: INVENTOR
Ferdinand Wesel
BY
ATTORNEYS.

No. 622,832. Patented Apr. 11, 1899.
F. WESEL.
ROUTING MACHINE.
(Application filed Mar. 23, 1898.)
(No Model.) 8 Sheets—Sheet 6.

WITNESSES
Bruno von Bültzingslöwen
Karl Kaelble

INVENTOR.
Ferdinand Wesel
BY
Goepel Raegener
ATTORNEYS.

No. 622,832. Patented Apr. 11, 1899.
F. WESEL.
ROUTING MACHINE.
(Application filed Mar. 23, 1898.)

(No Model.) 8 Sheets—Sheet 7.

WITNESSES:

INVENTOR
Ferdinand Wesel
BY
ATTORNEYS.

No. 622,832.　　　　　　　　　　　　　　　Patented Apr. 11, 1899.
F. WESEL.
ROUTING MACHINE.
(Application filed Mar. 23, 1898.)

(No Model.)　　　　　　　　　　　　　　　　8 Sheets—Sheet 8.

Fig. 19.

WITNESSES:

INVENTOR
Ferdinand Wesel
BY
ATTORNEYS.

UNITED STATES PATENT OFFICE.

FERDINAND WESEL, OF NEW YORK, N. Y.

ROUTING-MACHINE.

SPECIFICATION forming part of Letters Patent No. 622,832, dated April 11, 1899.

Application filed March 23, 1898. Serial No. 674,898. (No model.)

*To all whom it may concern:*

Be it known that I, FERDINAND WESEL, a citizen of the United States, residing at New York, in the borough of Brooklyn and State of New York, have invented certain new and useful Improvements in Routing-Machines, of which the following is a specification.

This invention relates to improvements in routing-machines or machines of that class which are known as "elbow-machines" and which are used by engravers on wood, metal, and other surfaces for removing by means of a routing-cutter such portions of the zinc plate, electrotype, woodcut, &c., as are not required for printing.

The invention consists of certain details of construction and combinations of parts, which will be fully described hereinafter, and finally pointed out in the claims.

In the accompanying drawings, Fig. 19 is a transverse section through the base of the machine, showing the levers or parts controlled by the treadles.

Similar letters of reference indicate corresponding parts.

Figure 1:
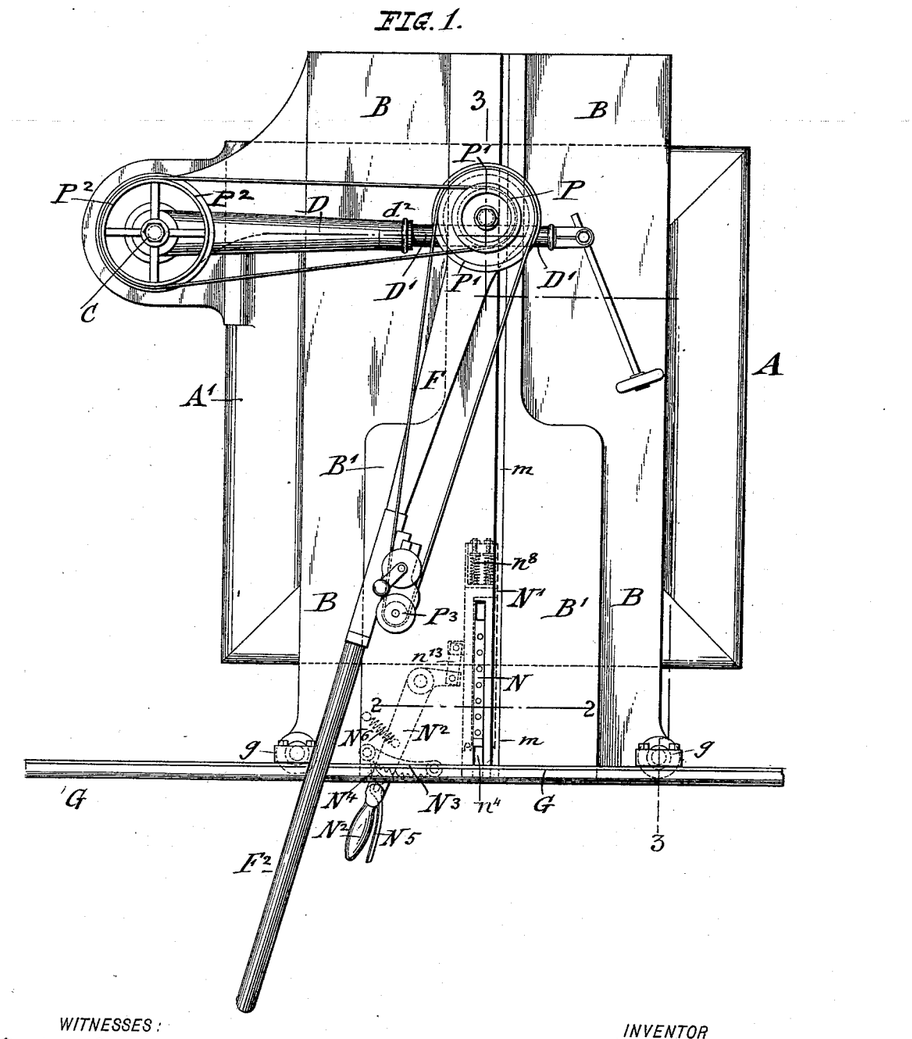
Figure 1 represents a plan view of my improved routing-machine.
Figure 2:
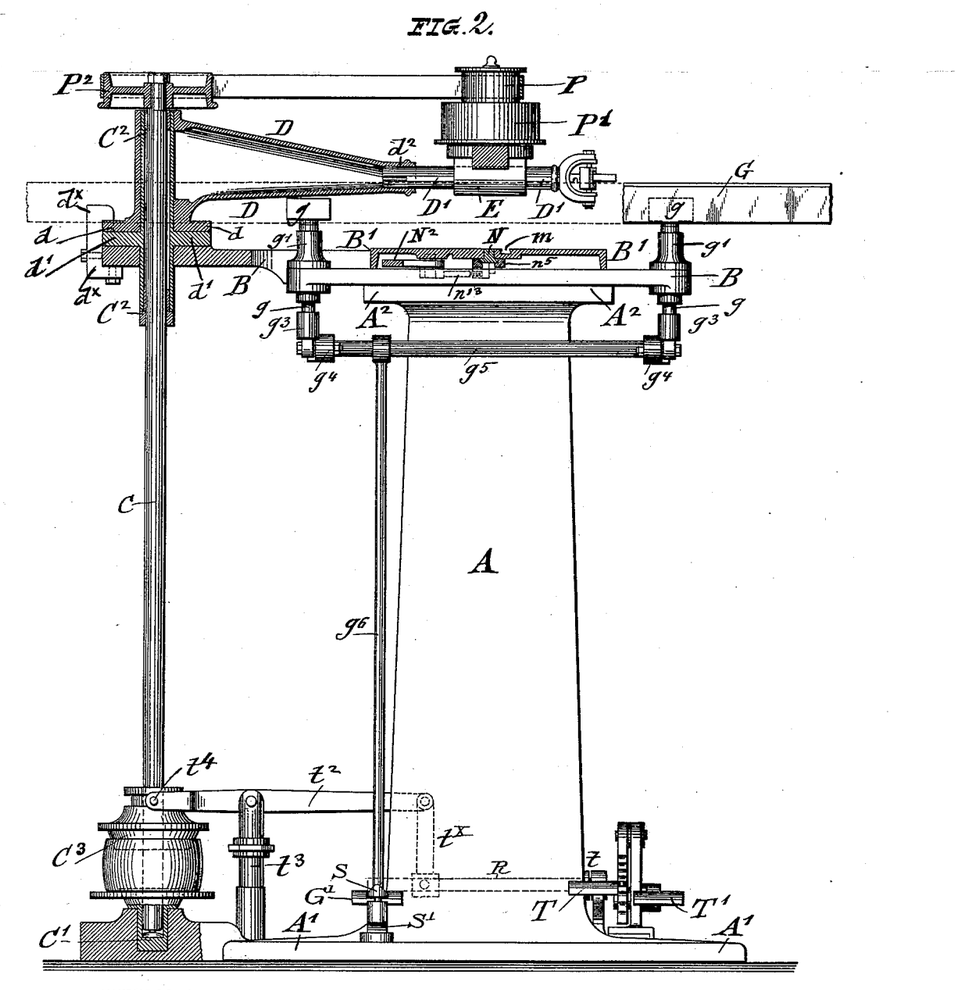
Fig. 2 is a front elevation of the same, partly in vertical section, on line 2 2, Fig. 1, and also partly in section through the transverse plane of the machine, which passes through the vertical power-shaft.
Figure 3:
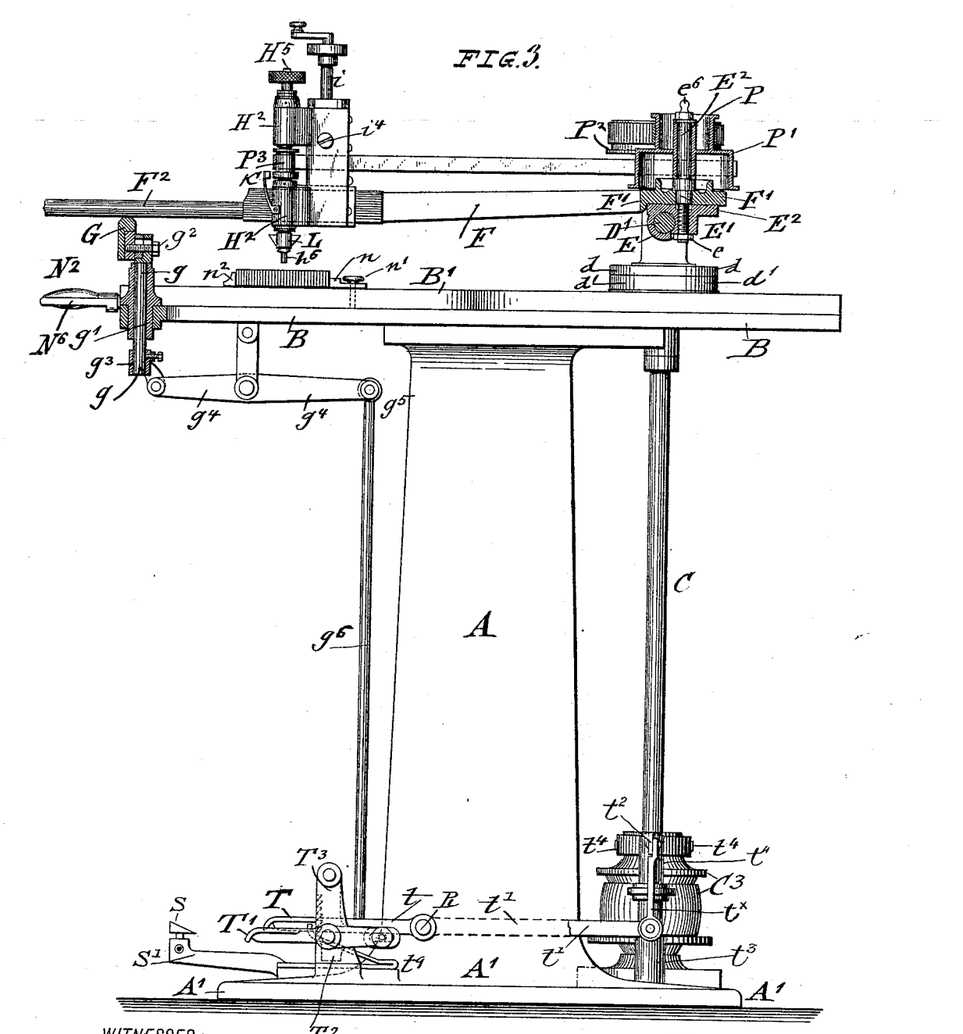
Fig. 3 is a side elevation, partly in vertical longitudinal section, on line 3 3, Fig. 1.

Referring to the drawings, A represents a hollow upright standard which is cast integrally with a large base A' and top A$^2$, the latter carrying a horizontal table B. On the table B is arranged a narrower table B', on which the blocks to be routed are placed and to which they are firmly locked by a clamping mechanism to be hereinafter described. At one side of the upright standard A is arranged a vertical shaft C, which is supported in a step-bearing C', arranged on the base-plate A', and in a neck-bearing C$^2$ on the table B, as shown in Figs. 2 and 3. The lower end of the shaft C is hardened and adapted to run on a hardened bearing-plate in the step-bearing. A friction-clutch C$^3$ is arranged on the shaft C and actuated by a treadle mechanism which will be described hereinafter and which serves for producing the starting and stopping of the routing-machine. The neck-bearing C$^2$ for the driving-shaft C is attached by suitable clamping devices $d^\times$ to the table B, as shown in Fig. 2. On the neck-bearing of the driving-shaft C is mounted the sleeve-shaped end of a hollow tapering lever-arm D, which turns freely by its disk-shaped base $d$ on a disk-shaped flange $d'$ of the neck-bearing C$^2$, said lever-arm being provided at its outer end with a socket $d^2$, into which is screwed a horizontal extension-arm D'. The disk $d$ has a recess in one edge, (not shown, however, as it is clear enough without,) which recess receives the inwardly-projecting end of the clamp $d^\times$, so that the partial rotation of the disk $d$ on the flange $d'$ will not be prevented. To the extension-arm D' is applied a sleeve E, which is provided with a horizontal bracket extension E', through which passes an upright spindle E$^2$, which is secured by a screw-nut $e$ at its lower threaded end to the bracket extension E', so as to be firmly supported thereon. On the sleeve E and its bracket extension E' is supported the disk-shaped end F' of the second lever-arm F of the jointed lever-arms D F, said lever-arm extending in forward direction over the table B and carrying about midway the support for the cutter-spindle, as shown in Figs. 1 and 3.

Figures 9, 10, 11, 12, 13:
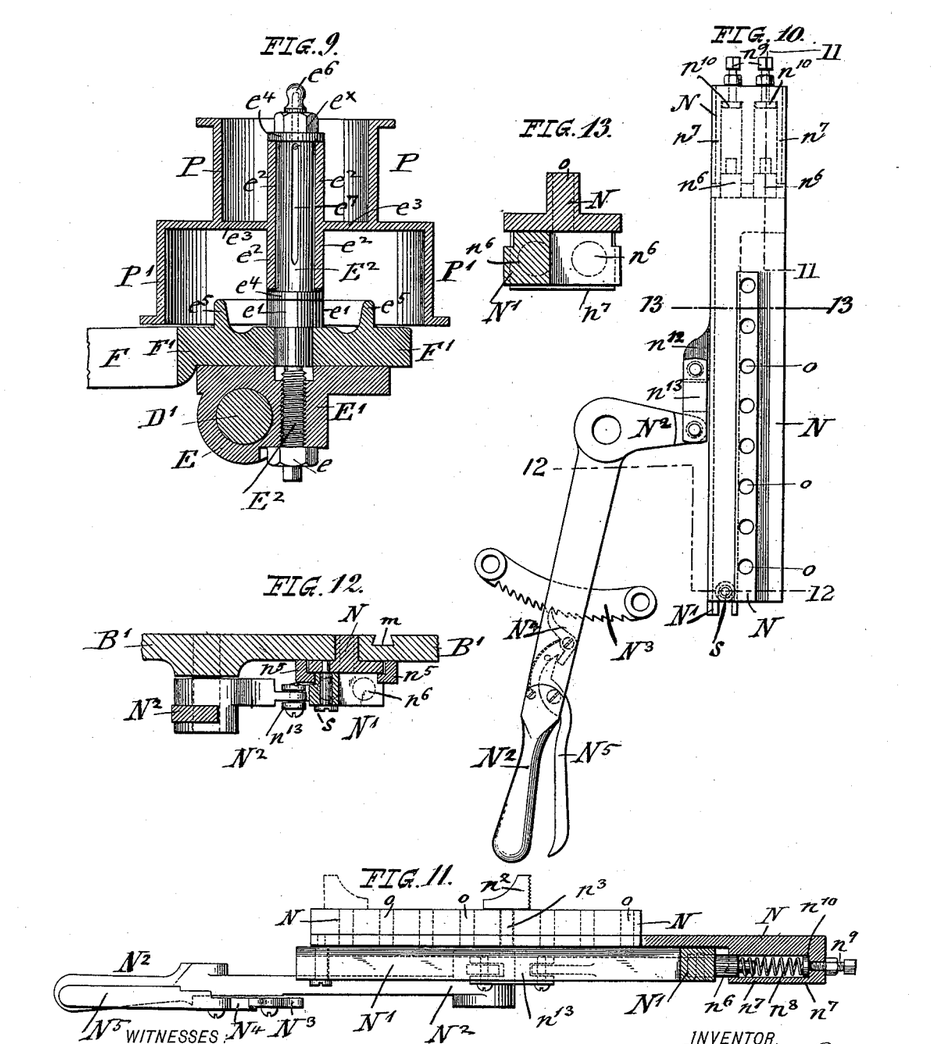
Fig. 9 is a vertical central section of the joint and driving-pulley of the elbow-levers supporting the routing-spindle.
Fig. 10 is a top view of the movable clamp and its actuating-lever mechanism.
Fig. 11 is a side elevation of Fig. 10, partly in section, on the line 11 11, same figure, through the box containing the springs.
Fig. 12 is a vertical transverse section through the bed-plate and the clamping mechanism thereon on line 12 12, Fig. 10.
Fig. 13 is a detail section on line 13 13, Fig. 10.
Figure 14:
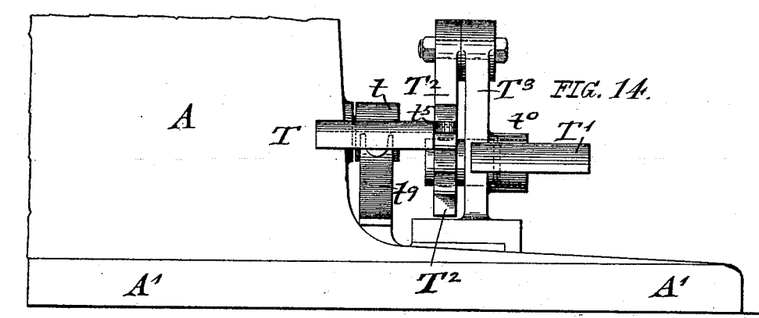
Figs. 14, 15, and 16 are respectively a front elevation, a side elevation, and a plan view of my improved treadle mechanism for starting or stopping the routing-machine.
Figure 15:
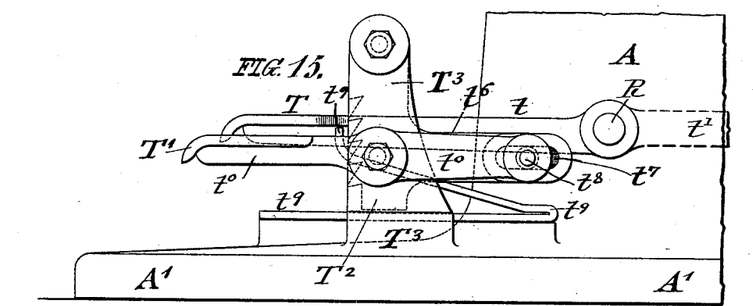
Figure 16:
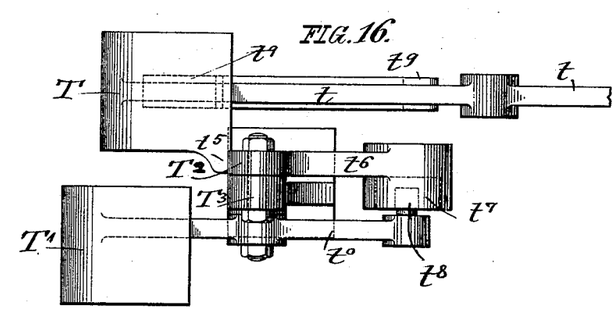
Figure 17:
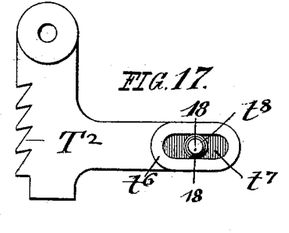
Figs. 17 and 18 are respectively a detail side view of the toothed locking-dog and a vertical section on line 18 18, Fig. 17.
Figure 18:
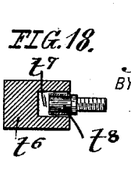

The disk-shaped end $F'$ turns freely on the vertical spindle $E^2$ and is retained on the bracket extension $E'$ of the sleeve E by a collar $e'$, which binds on the hub of the disk $F'$ by the screwing up of the nut $e$. On the spindle $E^2$, above the collar $e'$, is supported the sleeve-shaped hub $e^2$ of a double pulley P P', of which the smaller pulley P extends in upward direction and the larger pulley P' in downward direction from their common web $e^3$. The hub $e^2$ is retained in position on the collar $e'$ of the spindle $E^2$ by a screw-nut $e^\times$, applied to the upper threaded end of the spindle $E^2$ and washers $e^4$, which are respectively interposed between the lower end of the hub $e^2$ and the collar $e'$ and upper end of the hub $e^2$ and the screw-nut $e^\times$, as shown in Fig. 9. The small pulley P receives rotary motion by a belt from a larger pulley $P^2$ on the upper end of the driving-shaft C, while the pulley P' transmits rotary motion by a second belt to the small pulley $P^3$ on the cutter-spindle, as shown in Fig. 3. The pulleys P and $P^2$ are so arranged that the first belt can be freely removed therefrom and replaced thereon after tightening up, while the second or driving belt of the cutter-spindle can be easily removed from the pulley P' for being tightened up when necessary.

The motion of the rotary cutter is transmitted from the upright shaft C by the pulleys P P' $P^2$ $P^3$ and the belts running over the same to the cutter-spindle. The shaft C is started by shifting the splined member of the clutch $C^3$ into mesh with the loose member and stopped by raising the splined member out of mesh with the loose member. The operation of the clutch $C^3$ is accomplished by a double-treadle mechanism. (Shown in Figs. 2 and 3 and 14 to 18.) It consists of two treadles T T', of which the lever $t$ of the treadle T is mounted on one end of a rock-shaft R, journaled in upright standard A. Also mounted on the rock-shaft R is another and oppositely-projecting lever $t'$, which is pivoted to the lower end of a link $t^\times$, which actuates a third lever $t^2$, that is fulcrumed to an upright post $t^3$, said lever $t^2$ being forked at its end and adapted to engage by suitable pins $t^4$ the grooved neck of the splined clutch member, as shown in Figs. 2 and 3. The treadle T is provided with a laterally-projecting lug or pin $t^5$, which engages the teeth of an oscillating rack $T^2$, that is pivoted at its upper end to an upright support $T^3$, attached to the base $A'$ of the upright standard A. The rear part of the pivoted rack $T^2$ is provided with a weighted arm $t^6$, which is provided with a slotted recess $t^7$, that is engaged by a pin $t^8$ on the rear end of the lever $t^0$ of the second or releasing treadle T'. The lever $t^0$ is fulcrumed to the upright support $T^3$. The treadle T' is located sidewise of and somewhat in front of the treadle T. The treadle T' serves when depressed for oscillating the rack $T^2$ in backward direction, so as to release it from the laterally-extending lug or pin $t^5$ of the treadle T and produce the return of the treadle T, and thereby the lifting of the splined member of the clutch $C^3$ clear of the loose member, so that the routing-machine is instantly stopped. The return of the treadle T into raised position is produced by a strong V-shaped spring $t^9$, which acts on the under side of the lever $t$ of the treadle T, said spring overcoming the weight of the splined member of the clutch and holding it in raised position until the machine is to be started again, which is accomplished by depressing the treadle T and locking it into its lowered position by the rack $T^2$, from which it is released again by depressing the treadle T', so that the machine is instantly stopped.

The connection of the extension-arm D' with the lever-arm F is so accomplished that a free motion of the lever-arms D F at their joint or elbow is produced, while the connection of the parts can be readily screwed up and tightened from the outside by tightening up the screw-nuts at the ends of the upright spindle $E^2$. A cup $e^5$ is arranged at the upper side of the disk-shaped end $F'$ of the arm F and serves for producing the lubrication of the joints, so that they move with little friction one upon the other. The lubricating-oil is supplied to the cup $e^5$ from an oiler $e^6$ and a channel $e^7$ in the upper end of the spindle $E^2$.

Below the front end $F^2$ of the lever-arm F extends a guide-rail G, which is supported at the front end of the table B, said rail being attached by fastening-bolts $g^2$ to the upper enlarged ends of two vertical rods $g$, that are guided in stationary sockets $g'$ at the front part of the table B. The lower ends of the vertical rods $g$ are connected by means of sleeves $g^3$, clamped thereto, with fulcrumed levers $g^4$ below the table, said levers being connected by a transverse rod $g^5$ and a connecting-rod $g^6$ with a treadle G', pivoted on the end of rock-shaft R, so that on depressing the treadle G' the intermediate levers $g^4$ and guide-rods $g$ are operated, and thereby the guide-rail G raised. The guide-rail G lifts at the same time the extension $F^2$ of the lever-arm F and the cutter supported on the same, so that the operation of the routing-cutter is instantly interrupted.

A heel-rest S is arranged at the end of an arm or bracket S', fixed to the standard A, so that the heel of the operator may be placed upon the same in moving the treadle G'.

Figures 4, 5, 6:
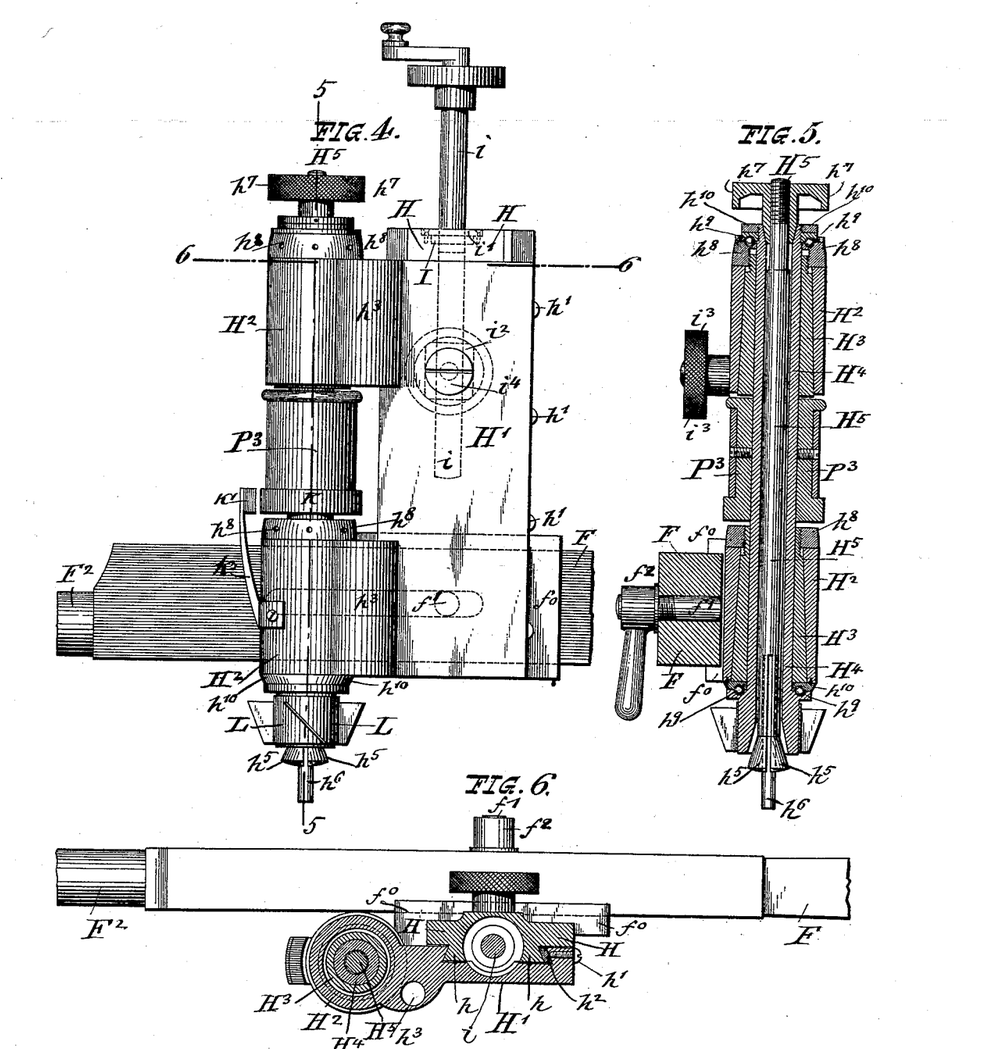
Fig. 4 is a side elevation of the routing-cutter, its supporting-spindle, and driving mechanism.
Figs. 5 and 6 are respectively a vertical central section on line 5 5, Fig. 4, and a horizontal section on line 6 6, Fig. 4.
Figure 7:
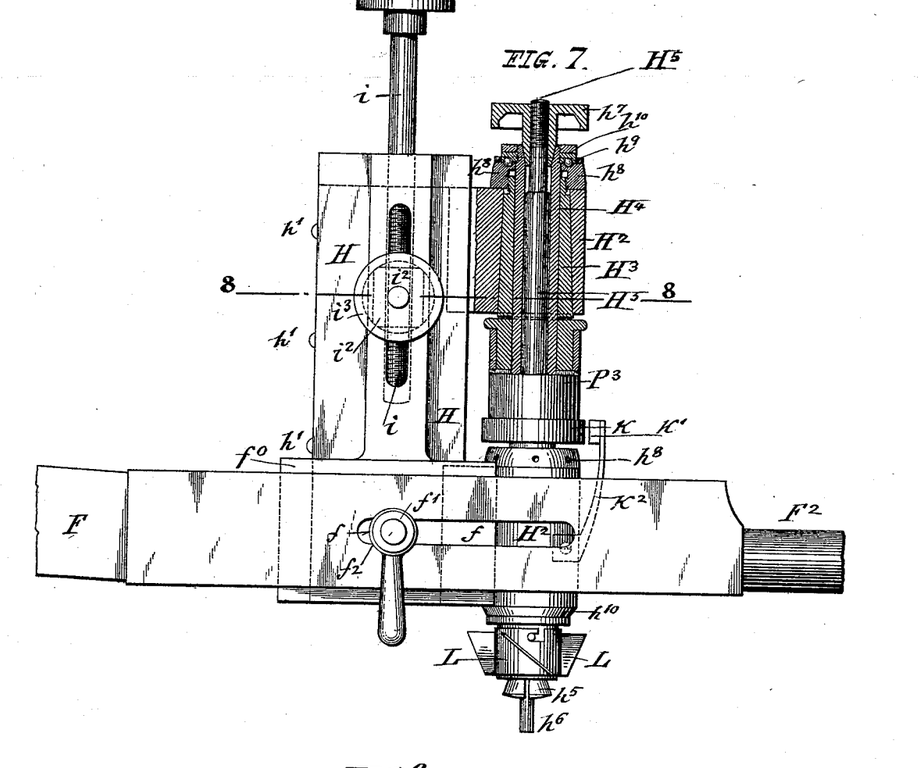
Fig. 7 is a rear elevation of the routing-cutter and its supporting and driving mechanism, partly in section.
Figure 8:
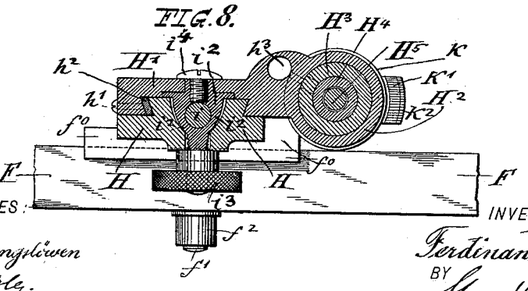
Fig. 8 is a horizontal section on line 8 8, Fig. 7.

The cutter-spindle and its support are shown in detail in Figs. 4 to 8. The supporting portion is attached to the lever-arm F by a shouldered plate $f^0$, clamping-screw $f'$, and nut $f^2$, the clamping-screw being guided in a slot $f$ of the arm F. The shouldered plate $f^0$ carries an upright plate H, having dovetailed ways $h$, on which is guided the correspondingly-grooved plate H', which is firmly retained thereon by set-screws $h'$ and an intermediate strip $h^2$, interposed at one side of the dovetailed ways and grooves in the plates H H', as shown in Figs. 6 and 8. The upright plate H' is provided at its upper and lower parts with laterally-extending sleeves $H^2$, which serve as supports for the conically-tapering bearings $H^3$ of the cutter-spindle, said sleeves being thickened adjacent to the plate H', so as to provide for arranging bore holes or channels $h^3$, by which the lubricant is conducted to the spindle-bearings. In the bearings $H^3$ of the sleeves $H^2$ is supported a tubular steel shaft $H^4$, in which the cutter-spindle $H^5$ is located. The cutter-spindle $H^5$ is provided at its lower end with a slitted and outwardly-flaring socket $h^5$ for the routing-cutter $h^6$ and at the upper end with a threaded portion for applying a milled screw-nut $h^7$, by which the spindle $H^5$ is drawn up into the tubular shaft $H^4$, so that the flaring socket portions are moved against the flaring lower edge of the tubular shaft $H^4$, and thereby the routing-tool firmly clamped to the cutter-spindle $H^5$. The upper end of the tubular shaft $H^4$ is likewise made flaring at its inner edge for receiving the tapering end of the screw-nut. The tubular shaft $H^4$ is supported in the conically-tapering bearings $H^3$, which are provided with screw-threaded upper ends, to which steel nuts $h^8$ are applied, which can be readily screwed up on the threaded ends of the bearings, so as to draw them into the correspondingly-tapering sleeves $H^3$. The screw-nuts $h^8$ are provided with radial holes in their circumference for permitting the inserting of a suitable lever and turning the nut for tightening up the bearings even while the cutter is operated. A drive-pulley $P^3$ for the cutter-spindle is arranged on the shaft $H^5$ between the upper and lower sleeves $H^2$ and attached thereto by suitable set-screws. To reduce the friction between the tubular shaft $H^4$ and the supporting-sleeves $H^3$, anti-friction-balls $h^9$ are interposed between cones $h^{10}$ at the upper end of the upper sleeve and at the lower end of the lower sleeve and suitable cone-grooves at the upper and lower ends of the tubular shaft $H^4$, said cones being attached in any approved manner to the sleeves $H^2$. The supporting-plate H', together with the routing mechanism, can be raised or lowered on the dovetailed guideways of the upright plate H by means of a screw-spindle $i$, which passes in downward direction into a suitable bore in plate H and engages a nut $i^2$, secured in the plate H' by a set-screw $i^4$. The screw-spindle $i$ has a flange I near its upper end, which is held down so as to prevent the longitudinal movement of said spindle by means of a plate $i'$, secured to the top of a plate H by suitable screws, so that by turning the screw-spindle $i$ in one or the other direction the supporting-plate H' is raised or lowered, and thereby the entire routing mechanism set to the required height above the table. After the plate H' is adjusted to the proper height a clamping-nut $i^3$ serves for retaining the screw-spindle $i$ in the required position.

The lower part of the pulley $P^3$ is provided with an enlarged cylindrical portion K, alongside of which is arranged a brake-shoe K' at the upper end of a spring-arm $K^2$, that is secured at its lower end to the lower sleeve $H^2$. When the brake-shoe K' is pressed with the finger against the cylindrical portion K of the pulley $P^3$, the rotation of the cutter-shaft $H^5$ can be quickly retarded and stopped. To the lower part of the cutter-shaft $H^4$ is applied, by means of a bayonet-joint, a fan L, the inclined wings or blades of which are made integral with the cylindrical hub of the fan, so that the chips produced by the routing-cutter are removed from the work by the air-current produced by the fan. The routing mechanism and its support are connected with the lever-arm F and can be adjusted forward or backward on the same by means of the clamping-screw $f'$, which passes through the slot $f^0$ of the arm, whenever this should be required for stretching tightly the transmitting-belt passing over the pulley $P^3$.

The zinc plate, wood-engraving, or other object to be operated upon by the routing-cutter is clamped to the table B', which is provided with a longitudinal guide-groove $m$, on which is arranged a stationary gage $n$, that is secured in the groove by means of a clamping-nut $n'$ in the well-known manner. The opposite end of the zinc plate, wood-engraving, or other object is pressed firmly against the gage $n$ by a second gage $n^2$, which is set by a bottom pin $n^3$ into one of the openings $o$ of a slide-piece N of inverted-T shape, the upper part of which is guided in a slot $n^4$ in the table B', parallel with slot $m$, while the lower part is guided in ways $n^5$ at the under side of the table, as shown in Figs. 2 and 12. At the rear end of the slide-piece N are arranged sockets $n^7$, which are made in one piece with the T-shaped front portion of said slide-piece. On the under side of the slide-piece N is arranged a relatively and longitudinally movable L-shaped piece N', the recessed front edge of which is guided on a headed screw $s$, attached to the slide-piece N, while the rear end is provided with guide-pins $n^6$, which enter into the sockets $n^7$ at the rear end of said slide-piece. Between the guide-pins $n^6$ and set-screws $n^9$, which are screwed into and supported by the closed ends of the sockets $n^7$, are interposed helical springs $n^8$, the tension of which is regulated by the set-screws $n^9$ and washers $n^{10}$ between the rear ends of the springs $n^8$ and the set-screws $n^9$.

The piece N' is connected by a laterally-extending lug $n^{12}$ and an intermediate pivot-link $n^{13}$ with the inner shorter arm of an elbow-lever $N^2$, that is fulcrumed to the under side of the table B' and extended beyond the front edge of the same, the forward end being made in the shape of a handle. A pivoted and spring-actuated pawl $N^4$, pivoted to the under side of the lever $N^2$, engages a stationary toothed segment $N^3$ at the under side of the table, so as to hold the lever $N^2$, and thereby the slide-pieces N N' and the locking-gage $n^2$, firmly in position. When it is desired to set the slide-piece N and the locking-gage $n^2$, the handle of the lever $N^2$ and the pivoted pawl-actuating handle $N^5$ are taken hold of and pressed toward each other, so that the pawl $N^4$ is released from the toothed segment $N^3$ and the lever $N^2$ permitted to swing on its fulcrum so as to move the locking-gage $n^2$ forward to lock against the zinc plate or backward to release the same from said gage. The locking-gage $n^2$ is dropped into the hole of the slide-piece next to the zinc plate or other object and then moved tightly against the same by the lever $N^2$ until the firm clamping of the zinc plate is obtained. The rigid clamping of the locking-gage $n^2$ to the zinc plate is obtained for the reason that the springs $n^8$ "give" sufficiently, so as to facilitate the engaging of the pawl $N^4$ with the nearest tooth of the segment $N^3$ without breaking the pawl or teeth. It will be readily understood that on first moving the lever $N^2$ forward the L-shaped piece N' will cause the springs $n^8$ to push the slide-piece N along until the locking-gage $n^2$ strikes against the object to be clamped and that then by reason of the resistance offered by said object the slide-piece N cannot be moved farther; but the lever $N^2$ can be moved still farther, because the springs $n^8$ yield to and are compressed by the L-shaped piece N', so that the pawl can be set as far forward against one of the teeth of the toothed segment $N^3$ as the springs will permit, and the extent to which the springs are compressed will determine the pressure exerted by the locking-gage upon the object clamped. By the clamping arrangement described zinc plates of larger or smaller size can be firmly clamped to the table and rigidly held in position for the action of the routing-cutter. When it is desired to remove the zinc plate, the locking-gage is released by liberating the pawl from the segment, upon which the lever $N^2$ can be quickly withdrawn into its normal position of rest by its spring $N^6$, so that the routed plate can be removed.

The advantages of my improved routing-machine consist, mainly, in its comparative simplicity and consequent economy of construction. Its driving-shaft is arranged as a part of the machine, so that the machine can be set up anywhere on the floor and is not required to be placed along a side wall or upright beam for receiving power. The jointed elbow-lever and the connection of the lever-arms at the joint are simple in construction and easily accessible from the outside without requiring the taking apart of the parts when they have to be readjusted. Considerable loss of time is thereby avoided by my construction of the jointed elbow-lever. The routing-head of the machine, with its cutter-spindle, is likewise greatly simplified and improved. The ball-bearings of the cutter-shaft permit the routing-cutter to be driven at high speed without undue vibration or heating. The ball-bearings also hold the cutter-shaft firmly in position and prevent the necessity of a too-frequent vertical adjustment of the cutter-spindle. Lastly, the improved clamp construction permits the quick and effective locking of the zinc plate or other object for the action of the routing-cutter and the instant release of the same after the routing work is accomplished.

Having thus described my invention, what I claim is—

1. In a routing-machine, the combination of an upright driving-shaft, a friction-clutch at the lower end of said driving-shaft, a jointed elbow-lever swiveled to the upper end of said driving-shaft, a treadle mechanism for actuating the friction-clutch, intermediate levers between the friction-clutch and treadle mechanism, said treadle mechanism consisting of a spring-actuated main treadle, a pivoted and weighted rack for locking said main treadle, and a releasing-treadle for withdrawing the rack from the main treadle and liberating the latter treadle, substantially as set forth.

2. In a routing-machine, a routing-head, composed of an upright plate, stationary sleeves on the same, conical bearings within said sleeves, a tubular cutter-shaft in said bearings, ball-bearings for the upper and lower ends of said cutter-shaft, screw-nuts applied to the upper ends of said conical bearings, a cutter-spindle in said cutter-shaft, a clutch at the lower end of said cutter-spindle, and a tapering screw-nut applied to the upper end of the spindle, the tapering end of said screw-nut being received by a correspondingly-flaring socket in the upper end of said cutter-shaft for adjusting it in the cutter-shaft, substantially as set forth.

3. In a routing-machine, a routing-head, the cutter-shaft of which is provided at its lower end with a fan device composed of a cylindrical sleeve, wings or plates on said sleeves, and a bayonet-fastening for applying said sleeve to the lower end of said cutter-shaft, substantially as set forth.

4. In a routing-machine, the combination, with a jointed lever-arm, of an upright supporting-plate attached to the outer arm of the same, an adjusting-plate guided thereon, routing mechanism supported by said adjusting-plate, a screw-nut located in a recess of the supporting-plate, and provided with a screw-threaded stem passing through a slot in said upright plate, a flanged screw-spindle engaging said screw-nut, a confining-plate in the upper end of the upright plate, above the flange on the screw-spindle, and a clamping-nut screwed onto the stem of said screw-nut for clamping said adjusting-plate and screw-spindle after adjustment of the routing mechanism, substantially as set forth.

5. In a routing-machine, the combination with the bed-plate, provided with a fixed gage, of a slide-piece provided with a locking-gage, a relatively and longitudinally movable piece guided along said slide-piece, springs carried by said slide-piece and adapted to be compressed by said longitudinally-movable piece, a fulcrumed lever connected with the latter, and mechanism for locking said lever in position against the tendency of said springs, substantially as set forth.

6. In a routing-machine, the combination with the bed-plate provided with a fixed gage, of a slide-piece provided with a locking-gage, ways for guiding said slide-piece, a relatively and longitudinally movable piece provided with means for guiding the same upon the slide-piece, springs interposed between the slide-piece and the longitudinally-movable piece, a fulcrumed lever connected with the longitudinally-movable piece, and mechanism for locking said lever, substantially as set forth.

In testimony that I claim the foregoing as my invention I have signed my name in presence of two subscribing witnesses.

FERDINAND WESEL.

Witnesses:
PAUL GOEPEL,
E. SMITH.